Figure 1:
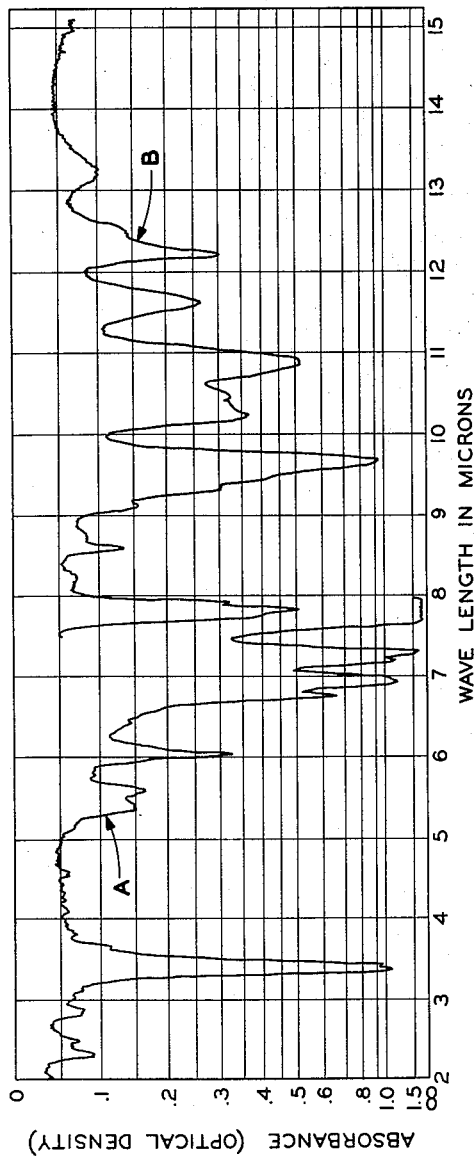

Oct. 18, 1960  M. J. DIAMOND  2,957,016
DIALKYL IMINYL THIONOPHOSPHATES
Filed Nov. 24, 1954

INVENTOR
MARTIN J. DIAMOND
BY
ATTORNEYS

2,957,016
DIALKYL IMINYL THIONOPHOSPHATES

Martin J. Diamond, Berkeley, Calif., assignor to California Spray-Chemical Corporation, Richmond, Calif., a corporation of Delaware Filed Nov. 24, 1954, Ser. No. 470,909

1 Claim. (Cl. 260—461)

This invention relates to a novel class of organic phosphorus compounds and new and useful methods of preparing the same. In particular, the invention relates to the production of a new class of O-organo iminyl phosphates and O-organo iminyl thionophosphates which are of particular value as toxicants and useful in the formulation of insecticidal compositions.

A new class of organic phosphorus compounds has been discovered which appears to contain a unique characteristic grouping within the molecule which imparts unusual properties thereto. These new compounds have been identified as containing the fundamental grouping:

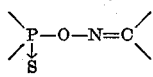

The residual valences on the phosphorus and carbon atoms may be satisfied with conventional radicals and selected to emphasize certain desirable physical and chemical characteristics associated with the projected application of the compound.

Illustrative of a class of the compounds of the invention which have been found to possess unusual toxicant properties are the compounds of the general formula:

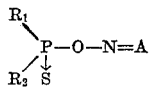

in which $R_1$ and $R_2$ may be alkoxy, alkylthio, or alkylamino radicals; A may be a carbocyclic radical linked to the N= through a nuclear carbon atom or a

radical in which $R_3$ is an organic radical and $R_4$ may be an inorganic or organic radical. The organic radicals of $R_4$ and/or $R_3$ may be hydrogen, heterocyclic, aromatic, acyclic or alicyclic radicals. For the sake of consistency in nomenclature, the radical

with the valence bonding through the nitrogen has been designated as an "iminyl" radical and, accordingly, these compounds are to be classified as O-organo iminyl thionophosphates.

These unique compounds have been produced by a number of generalized methods of preparation which result in the formation of the characteristic O-iminyl radical. Fundamentally, they involve the condensation of an oxime with a halothionophosphate which is postulated in accordance with the following equation:

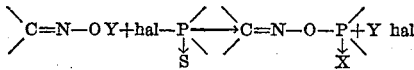

According to the variations in method of preparation, Y may be either hydrogen, in the case of the free oxime, or a metal such as an alkali metal, in the case of a metal oximate. The residual valences on the carbon of the oxime and the phosphorus of the halophosphate are not critical to the reaction and may be satisfied with radicals designed to emphasize the physical and chemical characteristics desired in the final product.

One of the specific methods of preparation involves the reaction of a metal salt of an oxime and, preferably, the sodium salt with a halothionophosphate and separation of the resulting metal halide. This reaction is preferably conducted in the presence of an inert solvent such as petroleum ether, benzene, toluene, cyclohexane, etc., for the purpose of facilitating the separation of reaction products, and at a reaction temperature between about 0° C. and 120° C. Reaction temperatures below 0° C. result in an impractical rate of reaction, whereas temperatures above about 100° C. usually result in a gradually decreased yield of desired compound by reason of apparent decomposition in the reaction product. Another method of preparation which has been found advantageous is the reaction of the free oxime with the halothionophosphate in the presence of a hydrogen halide sequestering agent such as pyridine. Again, this reaction may be conducted with or without the presence of an inert reaction solvent and, preferably, at reaction temperatures between about 0° C. and 100° C. Another method which likewise avoids the necessity of preparing the oxime salt is the reaction of the free oxime with the halothionophosphate and its equivalent in the presence of an acid-binding compound such as sodium carbonate. The reaction is preferably conducted in the presence of an inert solvent, and proceeds at an optimum rate between about 50° C. to 120° C. Additionally, the reaction is enhanced by the presence of a catalyst such as metallic copper and/or potassium bromide.

Generally, the choice of method of preparation will depend upon the nature of the reactants and composition of the desired reaction product. It has been found that the yields of reaction product will vary with the method of preparation and reaction conditions employed. On the basis of multiple preparations of the O-iminyl phosphates and thionophosphates of varying composition, it has been noted that generally the optimum method for preparing the O-iminyl phosphates is the reaction of the free oxime with the halophosphate in the presence of pyridine as the hydrogen halide sequestering agent, whereas optimum yields of the O-iminyl thionophosphates are obtained from the metal oximate reaction with the halothionophosphate.

As an illustration of the various types of reactants which have been applied in accordance with one or more of the aforementioned synthesis methods to produce representative compounds of the class of O-organo iminyl phosphates and thionophosphates, the following examples are cited: diethylchlorophosphate, diethylchlorothionophosphate, dimethylchlorophosphate, tetramethyldiamidochlorophosphate; and acetoxime, methyl n-propyl ketoxime, methyl cyclopropyl ketoxime, methyl i-butyl ketoxime, mesityl oxime, ethyl oximinoacetoacetate, p-chloroacetophenone oxime, dl-camphor oxime, monochloroacetoxime, cyclopentanone oxime, cyclohexanone oxime, pinacolone oxime, dimethylglyoxime, acetaldoxime.

As a means of identification and evidence of the characteristic grouping

Figure 2:
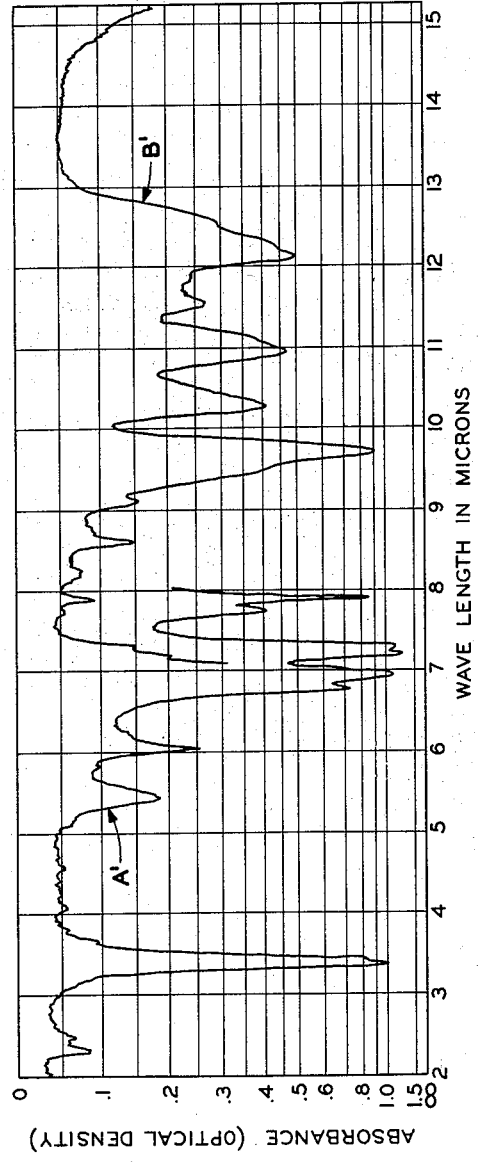

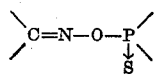

of the compounds of the invention, representative compounds were subjected to infrared spectographic analysis. The spectrograms reproduced as Figs. 1 and 2 were representative of two of the simple members of the class of O-organo iminyl phosphates and thionophosphates. Fig. 1 represents the infrared spectrogram of O,O-diethyl-O-propyliden-2-iminyl phosphate prepared in accordance with Example 1, and Fig. 2 represents the infrared spectrogram of O,O-diethyl-O-propyliden-2-iminyl thionophosphate as prepared in accordance with Example 2. These infrared spectrograms were prepared on a standard infrared recording spectrophotometer designed for measuring and recording the infrared transmission of solids, liquids and gases and consisting of a double infrared beam which scans the spectrum through the wave length range of 2.0 to 15+ microns, one part of the beam passing through the sample under study, the other passing through a compensating cell. In the spectrograms of Figs. 1 and 2, lines A and A[1] are the record of the undiluted compounds employing a 0.03 mm. NaCl cell, whereas lines B and B[1] are records obtained from the 2 percent solutions thereof in carbon disulfide employing a 0.12 mm. cell.

It will be noted that the principal characteristic absorption bands for these types of compounds are at $6.0\mu$, indicative of the C=N bond; $7.8\mu$, representing the P→O bond or $15+\mu$, in the case of the P→S bond; and $9.9\mu$, representing the P—O—C bond. The remaining strong absorption bands and peaks are definitive of the various elemental bonds associated with the organic residues of the iminyl and phosphate radicals and will vary in accordance therewith.

As an illustration of the various ramifications in composition of the class of compounds of the invention and the adaptability of the aforementioned methods of preparation, the following examples are presented. It is to be understood that the compounds prepared in these examples are merely representative of the various organic and inorganic residues falling within the scope of the O-organo iminyl phosphates and thionophosphates and are not to be construed as limitations in the scope of the invention.

*Example 1*

95 g. of sodium salt of acetoxime was suspended in 250 ml. of dry benzene. 170 g. of diethylchlorophosphate was added gradually with stirring while cooling with a water bath at room temperature. After the addition of the diethylchlorophosphate was complete, the mixture was warmed to 75° C. and held for 2 hours. The sodium chloride which was formed in the reaction product was removed by filtration and the solvent was distilled from the filtrate at reduced pressure, leaving 160 g. of an oil identified as O,O-diethyl-O-propyliden-2-iminyl phosphate. High vacuum distillation of this oil resulted in a clear, colorless product with a boiling point of 78° C. to 81° C. at $9 \times 10^{-3}$ mm. pressure. This boiling point was the liquid pot temperature taken in a molecular-type still distillation assembly. The O,O-diethyl-O-propyliden-2-iminyl phosphate possessed a refractive index $n_D^{20}=1.4370$, and analyzed as follows:

|  | Found | Theoretical |
|---|---|---|
| Percent C | 40.24 | 40.15 |
| Percent H | 7.84 | 7.65 |
| Percent N | 6.59 | 6.7 |
| Percent P | 15.23 | 14.85 |
| Percent O | 30.10 | 30.65 |
| Molecular weight | 214 | 209 |

This compound was found to be soluble in water, methyl alcohol, ethyl alcohol and benzene, and considerably less soluble in petroleum ether and normal heptane.

*Example 2*

285 g. of the sodium salt of acetoxime was suspended in 750 ml. of dry toluene. 555 g. of diethylchlorothionophosphate was added gradually with stirring while cooling with a water bath at room temperature. After the addition of the diethylchlorothionophosphate was complete, the mixture was warmed to 80° C. and held for 3 hours. The reaction mixture was washed with water to remove the suspended sodium chloride which was formed. The toluene solution was then dried with anhydrous sodium sulfate and the solvent removed by distillation at reduced pressure, retaining 615 g. of a dark oil. High vacuum distillation resulted in the recovery of O,O-diethyl-O-propyliden-2-iminyl thionophosphate as an orange oil with a boiling point taken from the liquid pot temperature in a molecular still of 57° C. to 60° C. at $5 \times 10^{-3}$ mm. pressure. This compound possessed a melting point of $-20°$ C. and a refractive index $n_D^{20}$ of 1.4770. The O,O-diethyl-O-propyliden-2-iminyl thionophosphate was determined to be soluble in methyl alcohol, ethyl alcohol and benzene, insoluble in water, and sparingly soluble in petroleum ether and normal heptane

*Example 3*

220 g. of acetoxime and 518 g. of diethylchlorophosphate were dissolved in 1500 ml. of dry benzene. 255 g. of dry pyridine was added gradually and the mixture refluxed at 78° C. for 2 hours. The white, solid pyridine hydrochloride which was formed was removed by filtration and the benzene was removed by distillation at reduced pressure, leaving an oily residue. High vacuum distillation of this oil resulted in the recovery of O,O-diethyl-O-propyliden-2-iminyl phosphate as in Example 1.

*Example 4*

73 g. of acetoxime was dissolved in 400 ml. of dry toluene and mixed with 70 g. of sodium carbonate and 2 g. of metallic copper. 185 g. of diethylchlorothionophosphate was added gradually with stirring and the mixture was heated to 90° C. and held for 3 hours. After cooling, the mixture was washed with water, filtered and the toluene layer dried with anhydrous sodium sulfate. An oily product was obtained after removal of the toluene. High vacuum distillation of the oil residue resulted in the isolation of O,O-diethyl-O-propyliden-2-iminyl thionophosphate as in Example 2.

*Example 5*

153 g. of the sodium salt of acetoxime was mixed with 1500 ml. of dry ether. 142 g. of dimethylchlorophosphate was added gradually while cooling with a water bath at room temperature. After the addition of the dimethylchlorophosphate was complete, the mixture was refluxed at 35° C. for 30 minutes. The sodium chloride which was formed was removed by filtration. Removal of the ether by distillation resulted in the recovery of 156 g. of O,O-dimethyl-O-propyliden-2-iminyl phosphate as a clear, yellow oil.

*Example 6*

9.5 g. of the sodium salt of acetoxime was mixed with 150 ml. of dry toluene. 17 g. of tetramethyldiamidochlorophosphate was added gradually and, after the addition was complete, the mixture was refluxed for 3 hours at 105° C. The sodium chloride formed was removed by filtration, and distillation of the filtrate at reduced pressure for removal of the toluene resulted in a yellow, oily product identified as N,N,N',N'-tetramethyl-diamido-O-propyliden-2-iminyl phosphate.

*Example 7*

2.7 g. of the sodium salt of mesityl oxime was mixed with 30 ml. of dry ether, followed by the addition of 3.4 g. of diethylchlorophosphate, which was added gradually with stirring. The mixture was then held at 33° C. for 1 hour and then filtered to remove the precipitated sodium chloride. Separation of the ether by distillation resulted in a yellow oil identified as O,O-diethyl-O-(4-methyl-3-pentenyliden-2-iminyl) phosphate.

Example 8

26 g. of the sodium salt of mesityl oxime in 250 ml. of dry benzene was reacted with 36 g. of diethylchlorothionophosphate according to the procedure of Example 2. The reaction mixture was maintained at 78° C. for 4 hours. After removal of the sodium chloride and the benzene solvent, 46 g. of an orange oil was obtained which was identified as O,O-diethyl-O-(4-methyl-3-pentenyliden-2-iminyl) thionophosphate.

Example 9

3.8 g. of the sodium salt of p-chloroacetophenone oxime was treated with 3.4 g. of diethylchlorophosphate following the procedure of Example 7. The resulting O,O-diethyl-O-[1-(4-chlorophenyl)ethyliden-1-iminyl] phosphate was recovered as a yellow oil.

Example 10

3.5 g. of the sodium salt of isophorone oxime was reacted with 3.4 g. of diethylchlorophosphate according to the procedure of Example 7. The resulting O,O-diethyl-O-(3,5,5-trimethyl-2-cyclohexen-1-iminyl) phosphate was separated and recovered as a yellow, oily product.

Example 11

13.5 g. of the sodium salt of cyclohexanone oxime was reacted with 17.2 g. of diethylchlorophosphate according to the procedure of Example 2. The resulting O,O-diethyl-O-cyclohexaniminyl phosphate was separated and recovered as a brown, oily product.

Example 12

6.8 g. of the sodium salt of pinacolone oxime was reacted with 8.6 g. of diethylchlorophosphate according to the procedure of Example 1. The reaction was maintained at 111° C. for 2 hours, and O,O-diethyl-O-(3,3-dimethylbutyliden-2-iminyl) phosphate was separated and recovered as a green, oily compound.

Example 13

6 g. of acetaldoxime was dissolved in 40 ml. of dry ether and 8 g. of dry pyridine. The solution was initially cooled to −10° C. 17 g. of diethylchlorophosphate was added gradually, during which time the temperature approached 20° C. The resulting pyridine hydrochloride was removed by filtration and the ether was stripped from the product by distillation to separate O,O-diethyl-O-ethylideniminyl phosphate as an oily compound.

Example 14

6.9 g. of the monosodium salt of dimethylglyoxime was reacted with 9.4 g. of diethylchlorothionophosphate according to the procedure of Example 1. 9 g. of O,O-diethyl-O-(3-oximinobutyliden-2-iminyl) thionophosphate was separated and recovered as a brown, oily product.

Example 15

6 g. of the sodium salt of ethylnitrolic acid in 30 ml. of benzene was reacted with 8 g. of diethylchlorophosphate according to the procedure of Example 1. The resulting O,O-diethyl-O-(1-nitroethyliden-1-iminyl) phosphate was separated and recovered as an oily product.

Example 16

8 g. of the disodium salt of dimethylglyoxime was reacted with 18.5 g. of diethylchlorothionophosphate according to the procedure of Example 1. 14 g. of bis-(O,O-diethyl)-O,O-(butyliden-2,3-diiminyl) dithionodiphosphate was separated and recovered as a brown, oily product.

Example 17

16.5 g. of the sodium salt of ethyloximinoacetoacetate was reacted with 17.2 g. of diethylchlorophosphate according to the procedure of Example 1. After separation and recovery, 20 g. of O,O-diethyl-O-(1-carbethoxypropyliden-2-iminyl) phosphate was obtained as a red oil.

Example 18

In addition to the foregoing examples, the sodium salts of the following oximes were reacted with diethylchlorothionophosphate according to the procedure of Example 1 to obtain the corresponding iminyl thionophosphates: methyl n-propyl ketoxime; methyl isopropyl ketoxime; methyl cyclopropyl ketoxime; methyl isobutyl ketoxime; monochloroacetoxime; and cyclopentanone oxime.

Although the unusual properties of this novel class of compounds identified by the characteristic grouping

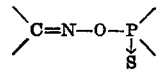

are adaptable to a variety of practical applications, their toxicant properties have been determined and the compounds have been found effective for the production of insecticidal compositions.

Obviously, many modifications and variations of the invention, as hereinbefore set forth, may be made without departing from the spirit and scope thereof, and therefore only such limitations should be imposed as are indicated in the appended claim.

I claim:

An iminyl thionophosphate of the formula

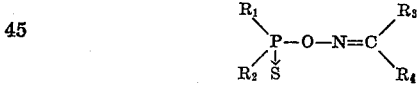

in which $R_1$ and $R_2$ are lower alkoxy radicals and $R_3$ and $R_4$ are radicals selected from the group consisting of hydrogen and acyclic radicals containing from 1 to 4 carbon atoms.

References Cited in the file of this patent

UNITED STATES PATENTS

| | | |
|---|---|---|
| 2,389,718 | Davis | Nov. 27, 1945 |
| 2,494,283 | Cassaday et al. | Jan. 10, 1950 |
| 2,816,128 | Allen | Dec. 10, 1957 |

OTHER REFERENCES

Atherton et al.: "Chem. & Industry" (1955), pp. 1183–1185.